UNITED STATES PATENT OFFICE.

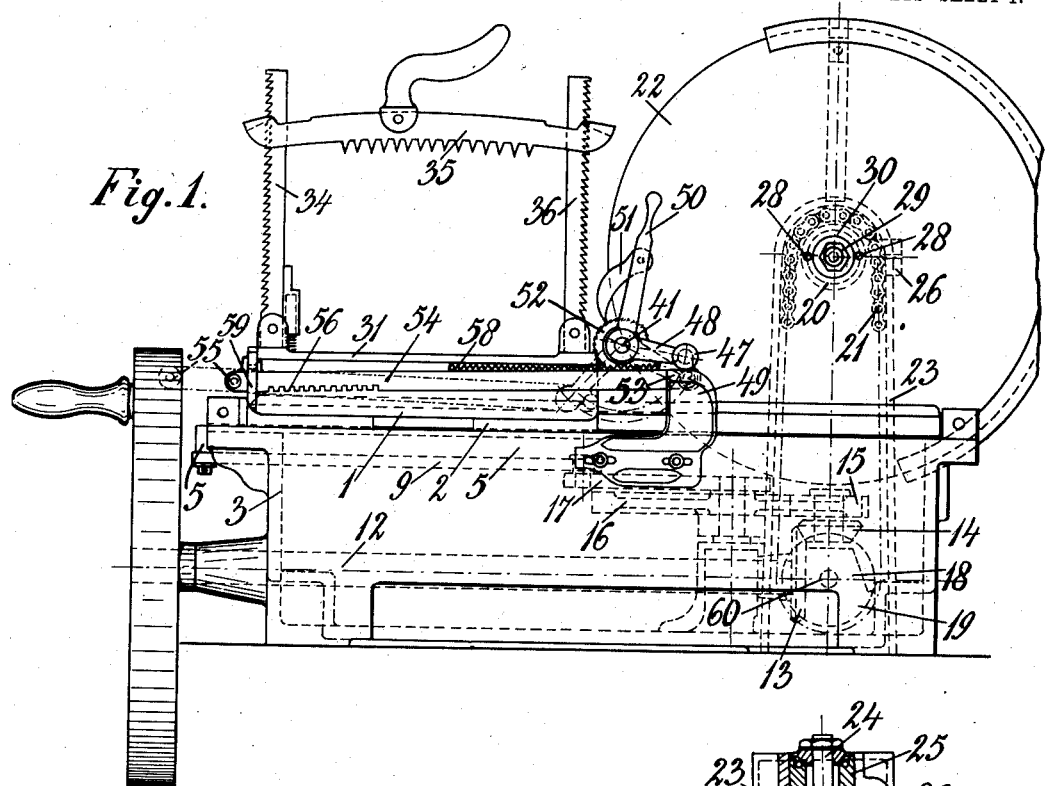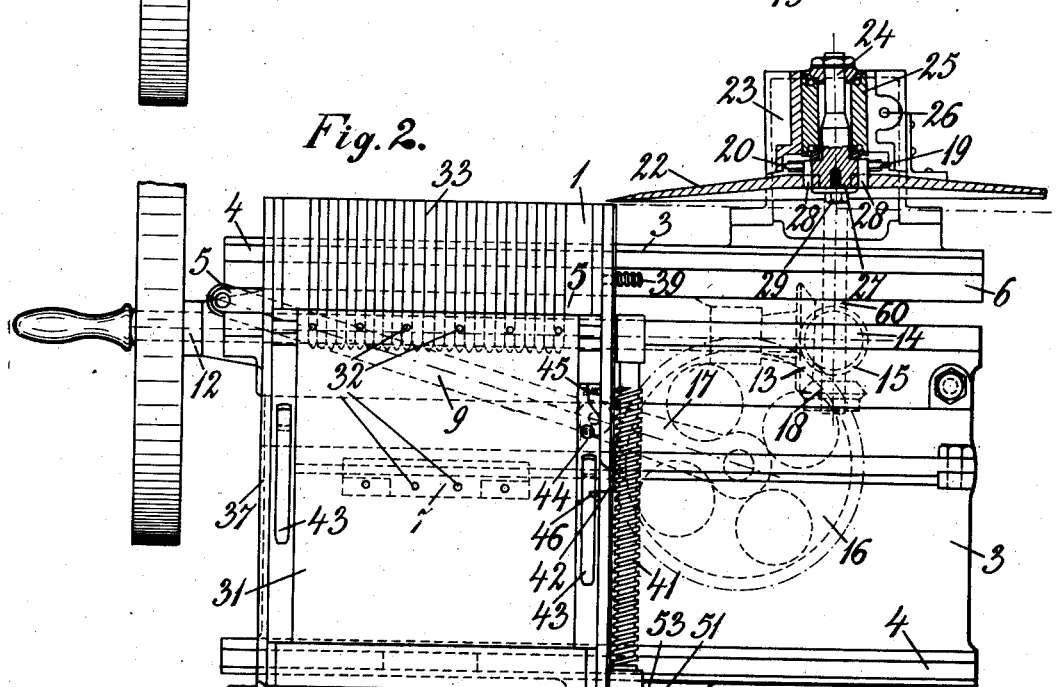

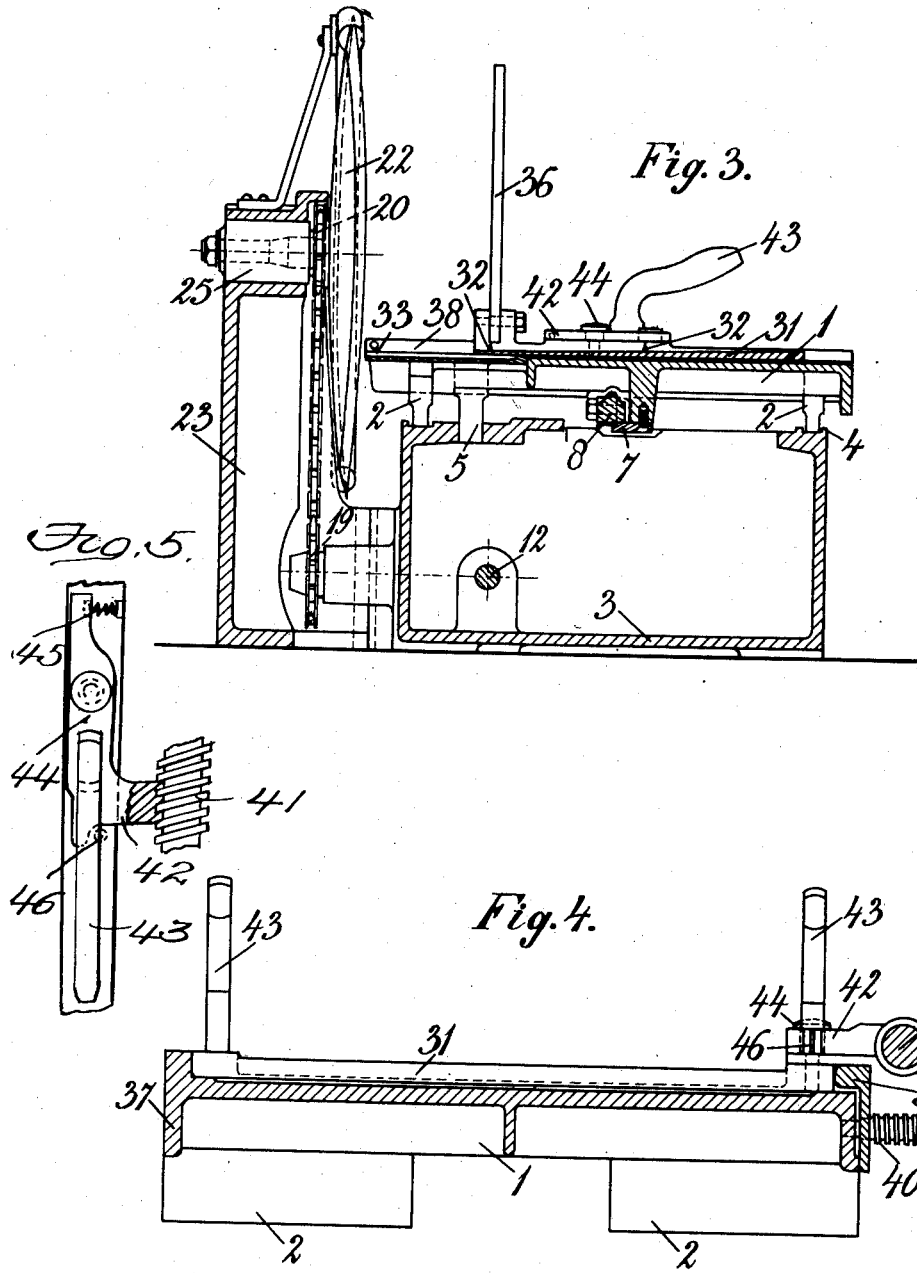

WILHELMUS ADRIANUS VAN BERKEL, OF ROTTERDAM, NETHERLANDS.

MEAT-SLICING MACHINE.

No. 901,855.  Specification of Letters Patent.  Patented Oct. 20, 1908.

Application filed September 14, 1905. Serial No. 278,432.

To all whom it may concern:

Be it known that I, WILHELMUS ADRIANUS VAN BERKEL, a subject of the Queen of the Netherlands, residing at 56 Boezemsingel, Rotterdam, in the Kingdom of the Netherlands, have invented certain new and useful Improvements in Meat-Slicing Machines, of which the following is a specification.

This invention is an improvement in slicing machines as disclosed by my U. S. Patents Numbers 628,742 of July 11, 1899, and 635,225 of October 17, 1899.

These improvements relate to:

a: Means for guiding the reciprocating meat table frame.

b: The mounting of the circular knife and the connection of this knife with the knife shaft.

c: The mounting of the loose meat plate in the reciprocating meat table, and finally d: The mechanism for progressively shifting the meat plate carrying the piece of meat after the cutting off of each slice, to the thickness of another slice.

A meat slicing machine in which these improvements are employed is shown in the accompanying drawings, in which, Figure 1 is a rear view; Fig. 2 a top view; and Fig. 3 a longitudinal section of the slicing machine; while Fig. 4 represents a section through the meat plate and reciprocating table. Fig. 5 is a detail view of a portion of the machine.

I will now describe the several improvements with reference to the accompanying drawings;—

The meat table 1 rests on four slides or shoes 2 which reciprocate in rectangular grooves 4 arranged on the top of the table frame 3. The meat table is secured against lateral displacement by means of two brackets or projections 5 guided in a groove 6 in the table frame, while a tongue 7 which engages under a cross-bar 8 secured to the frame prevents the meat table jumping or being unintentionally lifted off.

A drawbar 9 engages one of the two guiding brackets 5 by means of which drawbar the meat table is reciprocated in the ordinary way by means of a gear operated by a hand crank, which gear consists of a flywheel adapted to be mounted on a shaft 12, but not shown in the drawings, bevel wheels 13 and 14 spur wheels 15 and 16 and crank 17, with which the other end of the drawbar 9 engages. The first named bevel wheel 13 gears with a further bevel wheel 18 mounted on a transverse shaft 60 by means of which bevel wheel 18, by the intermediary of chain wheels 19 and 20 and a chain 21, the circular and spherical knife 22 is rotated.

The table frame 3 is closed beneath and on all four sides with the object of collecting oil dropping from the moving parts to enable it to be withdrawn from this box and used again (Fig. 3).

The transmission chain 21 for the knife is mounted in a chain box 23 which is held closed on all sides. The knife shaft 24 is mounted in a bush 25 on ball bearings, at the upper edge of this chain box. This bush 25 may be placed somewhat obliquely in order to allow of the circular knife being placed obliquely to the out face of the piece of meat and is also arranged so as to be adjustable longitudinally, while its position and that of the knife in the machine may be fixed by means of a clamp bolt 26. This displacement of the knife is among other things necessary when the knife edge is worn by cutting for too long a time and thus comes to lie too far from the front edge of the meat table. The knife shaft 24 and chain wheel 20 are preferably integral.

The knife 22 is placed or pushed over the central stud 27 of the shaft, and secured against rotation by two pins 28 and clamped on the shaft by means of a screw bolt 29 and washer 30 (Fig. 2).

The meat plate 31 may be formed tapering or slanting towards the front (Fig. 3) and provided in the ordinary manner with points 32 for holding fast the piece of meat, and the front edge of the meat table is also provided with ribs or corrugations 33.

Now in order to be able to remove the piece of meat which is clamped on the meat plate 31 by means of the meat clamps 34, 35, 36, (Fig. 1) together with said plate from the meat table, the meat plate is loosely placed on the table between lateral guide bars 37, 38 (Fig. 4). Of these bars, one 38 is spring mounted. Its downwardly projecting bar end is pressed against the side edge of the meat plate by a spiral spring 40 mounted on suitable connecting pins 39. By this means an exact guidance of the meat plate is insured.

The mechanism for shifting the meat plate forward after each cut consists of a screw spindle 41 arranged at the side of the meat plate.

An arm 42 with a toothed end is pivotally mounted on the meat plate and is brought into and out of engagement with the screw spindle 41. Now the improvement in this part of the machine consists in the toothed arm being formed as a whole with one of the two handles 43 of the meat plate. This part is pivoted on the pin 44 and is pressed by a spiral spring 45 against the screw spindle 41 so that the teeth of the arm 42 always stands in good engagement with the screw spindle 41.

In order to displace the meat plate or to lift the same off, it is merely necessary to turn the handle 43 on the right hand side a little to the left, in order to release the toothed arm from the screw spindle, while by means of the pin 44 this arm is prevented from being turned too far back under the action of the spiral spring 45.

It is evident that by turning the screw spindle, the meat plate 31 is shifted and this rotation is obtained by means of a roller 47 which is mounted at the end of a lever 48 on the screw spindle, and in the reciprocating movement of the meat plate, is allowed to encounter an inclined track 49. This track or bracket is firmly connected to the table frame. In this manner a uniform adjustment or displacement of the screw spindle and the meat plate is obtained, the length of which is determined by the height of the upper edge of the inclined track or bracket 49 above the lowest position of the roller 47. Any alteration which is made in this position will have as a consequence an alteration of the displacement of the spindle and the meat plate and the thickness of the slice of meat cut off.

Now in order to allow of the thickness of the slice being exactly regulated, the roller lever 48 is loosely mounted on the screw spindle 41, and formed as an elbow lever being provided with a suitable handle 50. A pawl 51 is connected with the handle 50, which pawl gears with a ratchet wheel 52 firmly mounted on the screw spindle 41. A second one-armed lever 53 is also loosely and revolubly mounted on the screw spindle 41, to the end of which a drawbar 54 is connected which is prolonged to the other side of the meat table. This end is provided with a handle 55 and at the lower side with notches 56. Graduations from 1 to 14 are marked on the upper side of the drawbar which coincide with the notches 56 and correspond to the various thicknesses of slice which are to be cut on the machine. Finally the shaft 57 of the roller 47 is prolonged towards the rear (Fig. 2) and rests on a suitable notch in the one armed lever 53 just referred to (Figs. 1 and 2). The elbow lever 48 is held under the influence of a spiral spring 58.

The highest position of the lever 48 on the one armed lever 53 which corresponds to the thinnest slice to be cut on the machine and nearly reaches to the top face of the inclined track 49 is represented in Fig. 1 in full lines and the lowest position in which the drawbar 54 is fully drawn out in dotted lines. In this position the thickest slices are cut on the machine.

The thickness of slice each time desired is fixed by one of the notches 56 of the drawbar 54 being fixed in a loop or stirrup 59.

The progressive movement proceeds as follows:—By adjusting the drawbar 54 in a given notch the lever 53 receives the position corresponding to this thickness of slice. If the meat table be moved to the right (Fig. 1), the elbow lever 48 is drawn down by its spiral spring 58 until the shaft 57 of the roller 47 rests on the one-armed lever 53, and thereby the pawl 51 slips over a certain number of teeth of the ratchet wheel 52. In moving forward the roller 47 then encounters the inclined track or bracket 49 and thus lifts the elbow lever 48 and consequently the ratchet wheel and the screw spindle are partially turned, whereby the meat plate is moved forward to the extent of the thickness of a slice. This operation is repeated at each reciprocation of the moving meat table.

The inclined bracket or track must be adjusted on the table frame in such a way that in the outermost left hand position, the roller 47 rests entirely on top of the horizontal part of the track (Fig. 1).

The advantages of this improved arrangement of the shifting mechanism are that its position on the meat table allows of the meat plate being able to be freely moved alongside of it, and the adjustment of the thickness of the slice can take place from the spot where the fly wheel which is mounted on the shaft 12 is revolved, that is to say, without having to reach over the piece of meat.

Having now particularly described and ascertained the nature of my said invention and in what manner the same is to be performed, I declare that what I claim is:

1. In a meat slicing machine, the combination of a reciprocating table having depending projections and a tongue, a supporting frame for the table provided with rectangular grooves engaged by said projections, a guide bar on the frame under which the tongue projects, means for receiving oil from the mechanism, a movable meat plate, means for holding said meat plate in proper position, guiding and gradually feeding the same forward relative to said table, and means for regulating the feed of the meat plate relative to the table.

2. In a meat slicing machine, the combination of a reciprocating table, a supporting frame for the table, means for guiding the table relative to the frame, a meat plate on the table, guide bars, one of the latter being fixed to and the other yieldingly mounted on the said table and adapted to guide the meat plate, and means for regulating the feed of the meat plate relative to the table.

3. In a meat slicing machine, the combination of a reciprocating table, a supporting frame for the table, the table and frame having engaging means, guide means for the table, a meat plate on the table, a threaded shaft mounted on and extending transversely over the table, handles on the meat plate, one of the handles being rotatable and having an arm fixed thereto and movable therewith and provided with a toothed end to engage the said threaded shaft, the toothed arm being adapted to be turned out of engagement from the shaft by the rotatable handle.

4. In a meat slicing machine, the combination of a reciprocating table, a supporting frame for the table, the table and frame having engaging means, guides for the table, a meat plate on the table, a threaded shaft also mounted on the table and extending transversely thereover, handles on the meat plate, one of the handles being rotatable and having means fixed thereto for engaging the shaft to feed the table, a ratchet wheel and elbow lever on the threaded shaft, the lever being loosely mounted on the shaft, a pawl carried by one arm of the elbow lever and engaging the shaft, a roller carried by the other arm of the lever, an inclined track rigidly mounted on the frame and adapted to be engaged by the said roller when the table is reciprocated on the frame, a graduated bar adjustably mounted on the frame and having a series of notches, a stirrup in which said bar is fixed and connecting means between the pawl and bar for regulating the forward movement of the meat plate.

5. In a meat slicing machine, the combination of a reciprocating table, a frame for supporting the table, knives for the table held by the frame, a meat plate on the table, a feeding shaft for controlling the movement of the meat plate forwardly on the table, handles on the meat plate, one handle being rotatable and provided with an arm having a toothed end to removably engage the feeding shaft and thrown into and out of engagement with relation to said shaft by turning the rotatable handle, a circular and spherical knife movably mounted on the frame obliquely to the latter and having a shaft, a box in which the said knife shaft is longitudinally adjustable, and clamping means coöperating with the box and shaft to hold the said shaft and knife in adjusted position.

In testimony whereof I have hereunto set my hand in presence of two subscribing witnesses.

WILHELMUS ADRIANUS VAN BERKEL.

Witnesses:
    ARNOLDUS CORNELIS VAN DER WAARDEN,
    ANTONIUS JOHANNES HUIJGEN.